Patented Aug. 6, 1929

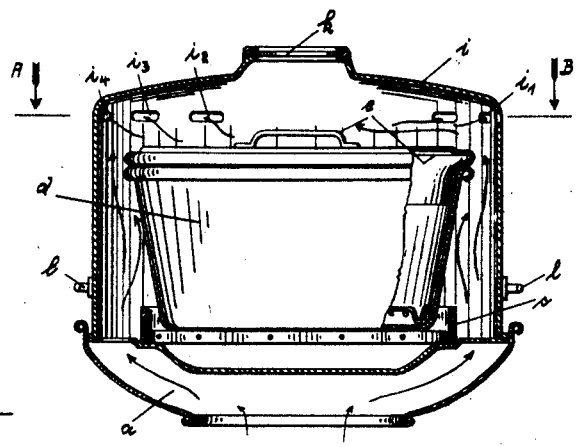
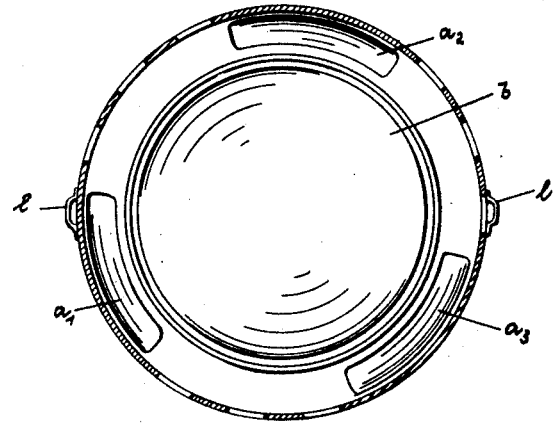
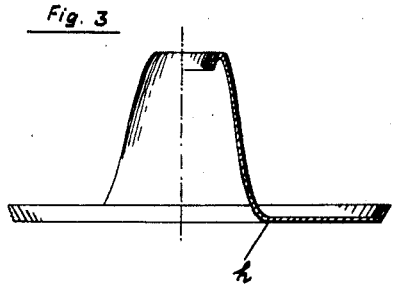
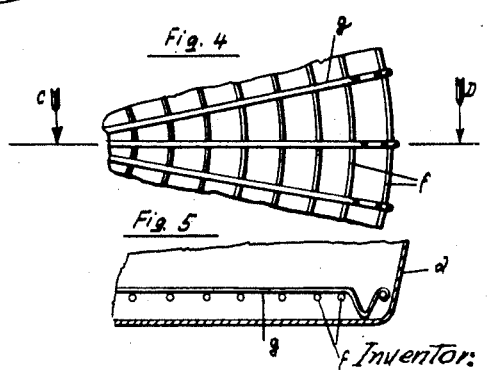
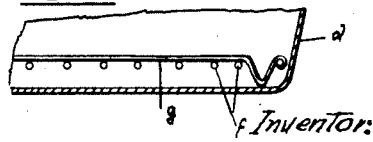

1,723,413

UNITED STATES PATENT OFFICE.

HUGO DREHMANN, OF WANDSBEK, GERMANY.

DEVICE FOR ROASTING, BAKING, AND STEAMING.

Application filed February 28, 1928, Serial No. 257,741, and in Germany March 3, 1927. Renewed June 24, 1929.

The object of the invention is to provide a device for baking, roasting, steaming and toasting capable of being used for any kind of heat-supply system with an open flame.

All known baking devices used with an open flame have the disadvantage that they can only be used for baking ring cakes because the heating gas reaches them from the centre of the apparatus. This disadvantage is entirely done away with in the case of the invention here described, because the heating gases are admitted, positively, from the side before they can pass over the material to be baked or roasted, as the case may be. It is thus possible to bake fruit cake, tarts and other cakes and to roast fowl and other articles.

Another advantage possessed by the present invention is that it may be used for steaming as well as for roasting. Finally, it should be mentioned that, according to requirements, an inset for ring cakes or a lid for steaming purposes may be interchangeably used.

The illustration shows one of the several ways in which the device can be used, and the figures in particular show the following:

Fig. 1, a cross section of the device;

Fig. 2, a cut across the line A—B, the shape of the receptacle used for the material to be roasted or baked being ignored;

Fig. 3, the inset required for ring cakes;

Fig. 4, a part (in the shape of a segment) of the grating used for roasting;

Fig. 5, a view of the grating along the line C—D;

Fig. 6, a part sectional view of the insulating plate.

The invention consists of the stand ($a$) which supports the insulating plate ($b$) and the ring ($c$), the latter surrounding the former. The receptacle ($d$) containing the material to be baked or roasted is placed upon the insulating plate. This receptacle must be covered with the lid ($e$) if the device is to be used for steaming. If roasting is to be done, a grating (cf. Figs. 4 and 5) consisting of several rings ($f$) and several radial stays ($g$) may be used, and if ring cakes are to be baked, an inset ($h$), (cf. Fig. 3), is inserted in the receptacle ($d$). The whole is surmounted by the cover ($i$) which is provided with a testing aperture ($k$) at the most suitable place for it. This aperture is covered with some transparent material.

In order to effect the admission and subsequent distribution of the heating gas, the supporting stand is provided with two, three or more curved slits ($a_1$, $a_2$, $a_3$ . . .) equi-axially arranged in staggered fashion, and the cover with recesses ($i_1$, $i_2$, $i_3$ . . .) facing each other in pairs or in groups, as the case may be.

If the cover ($i$) is placed upon the stand ($a$), it is possible to adjust its position, by the use of marks, in such a way that the slits ($a_1$, $a_2$, $a_3$ . . .) of the stand ($a$) and the groups of recesses ($i_1$, $i_2$, $i_3$ . . .) are arranged in staggered fashion. The effect of this arrangement is that the heating gases ascend through the various curved slits ($a_1$, $a_2$, $a_3$ . . .), after which they pass horizontally under the rounded cover ($i$), then intersect each other like bands and pass over the material to be baked or roasted until they finally escape from under the cover ($i$) through the opposing slits ($i_1$, $i_2$, $i_3$ . . .). In consequence of the difference in temperature at the places of admission ($a_1$, $a_2$, $a_3$ . . .) and the places of escape ($i_1$, $i_2$, $i_3$ . . .) the circulation of heat is automatically maintained intact throughout the period of baking, roasting, or steaming (as the case may be). The cover ($i$) has been provided with insulating handles ($l$) for lifting it.

What is claimed is the following:

A device for baking, roasting and steaming, comprising a base having a circular opening adapted to be supported over an open flame, a bead surrounding the upper edge of the base, an insulating plate supported by the base over the opening, the said plate being spaced from the bead by a rim having several circumferentially spaced openings to allow passage for the heated air, a cover having an aperture in the top thereof, a transparent covering for the aperture, and a receptacle containing the material to be cooked supported on the plate.

In testimony whereof I affix my signature.

HUGO DREHMANN.